(12) United States Patent
Taniguchi

(10) Patent No.: US 10,017,065 B2
(45) Date of Patent: Jul. 10, 2018

(54) POWER RECEPTION DEVICE AND VEHICLE INCLUDING THE SAME

(71) Applicant: TOYOTA JIDOSHA KABUSHIKI KAISHA, Toyota-shi, Aichi-ken (JP)

(72) Inventor: Satoshi Taniguchi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 158 days.

(21) Appl. No.: 15/129,748

(22) PCT Filed: Mar. 26, 2015

(86) PCT No.: PCT/JP2015/001716
§ 371 (c)(1),
(2) Date: Sep. 27, 2016

(87) PCT Pub. No.: WO2015/151467
PCT Pub. Date: Oct. 8, 2015

(65) Prior Publication Data
US 2017/0129358 A1    May 11, 2017

(30) Foreign Application Priority Data
Apr. 4, 2014  (JP) .................. 2014-077795

(51) Int. Cl.
*H01F 27/42* (2006.01)
*H01F 37/00* (2006.01)
(Continued)

(52) U.S. Cl.
CPC ......... *B60L 11/1831* (2013.01); *B60L 11/182* (2013.01); *H02J 7/0021* (2013.01); *H02J 7/025* (2013.01); *H02J 7/045* (2013.01)

(58) Field of Classification Search
CPC .... H02J 7/025; H02J 7/045; H02J 7/02; H02J 7/04; H02J 7/00; H02J 17/00; H02J 5/005; H02J 5/00
(Continued)

(56) References Cited

U.S. PATENT DOCUMENTS

| | | | |
|---|---|---|---|
| 7,741,734 | B2 | 6/2010 | Joannopoulos et al. |
| 2007/0222542 | A1 | 9/2007 | Joannopoulos et al. |

(Continued)

FOREIGN PATENT DOCUMENTS

| | | |
|---|---|---|
| AU | 2006269374 B2 | 1/2007 |
| AU | 2006269374 C1 | 1/2007 |

(Continued)

*Primary Examiner* — Rexford Barnie
*Assistant Examiner* — Jagdeep Dhillon
(74) *Attorney, Agent, or Firm* — Oliff PLC

(57) ABSTRACT

A power reception coil of a power reception unit is configured to receive, in a contactless manner, the electric power output from a power transmission coil of a power transmission unit. A rectifying circuit includes a rectifier and a capacitor provided on an output side of the rectifier, and rectifies the electric power received by the power reception coil. A voltage sensor is provided on an output side of the rectifying circuit. A vehicle ECU detects rising of a voltage detected by the voltage sensor, and detects a distance between the coils based on a movement distance of a vehicle from a reference distance indicative of the distance between the coils at which the rising of voltage occurs, the reference distance is prepared in advance.

9 Claims, 7 Drawing Sheets

(51) Int. Cl.
*H01F 38/00* (2006.01)
*B60L 11/18* (2006.01)
*H02J 7/00* (2006.01)
*H02J 7/02* (2016.01)
*H02J 7/04* (2006.01)

(58) Field of Classification Search
USPC ....... 307/104, 149, 10.1, 9.1, 43, 66; 342/70
See application file for complete search history.

(56) References Cited

U.S. PATENT DOCUMENTS

| | | | |
|---|---|---|---|
| 2008/0278264 A1 | 11/2008 | Karalis et al. | |
| 2009/0135049 A1* | 5/2009 | Kikuchi | B60W 30/17 342/70 |
| 2009/0195332 A1 | 8/2009 | Joannopoulos et al. | |
| 2009/0195333 A1 | 8/2009 | Joannopoulos et al. | |
| 2009/0224856 A1 | 9/2009 | Karalis et al. | |
| 2009/0267709 A1 | 10/2009 | Joannopoulos et al. | |
| 2009/0267710 A1 | 10/2009 | Joannopoulos et al. | |
| 2010/0096934 A1 | 4/2010 | Joannopoulos et al. | |
| 2010/0102639 A1 | 4/2010 | Joannopoulos et al. | |
| 2010/0102640 A1 | 4/2010 | Joannopoulos et al. | |
| 2010/0102641 A1 | 4/2010 | Joannopoulos et al. | |
| 2010/0117455 A1 | 5/2010 | Joannopoulos et al. | |
| 2010/0117456 A1 | 5/2010 | Karalis et al. | |
| 2010/0123353 A1 | 5/2010 | Joannopoulos et al. | |
| 2010/0123354 A1 | 5/2010 | Joannopoulos et al. | |
| 2010/0123355 A1 | 5/2010 | Joannopoulos et al. | |
| 2010/0127573 A1 | 5/2010 | Joannopoulos et al. | |
| 2010/0127574 A1 | 5/2010 | Joannopoulos et al. | |
| 2010/0127575 A1 | 5/2010 | Joannopoulos et al. | |
| 2010/0133918 A1 | 6/2010 | Joannopoulos et al. | |
| 2010/0133919 A1 | 6/2010 | Joannopoulos et al. | |
| 2010/0133920 A1 | 6/2010 | Joannopoulos et al. | |
| 2010/0171370 A1 | 7/2010 | Karalis et al. | |
| 2010/0181844 A1 | 7/2010 | Karalis et al. | |
| 2010/0187911 A1 | 7/2010 | Joannopoulos et al. | |
| 2010/0201205 A1 | 8/2010 | Karalis et al. | |
| 2010/0207458 A1 | 8/2010 | Joannopoulos et al. | |
| 2010/0225175 A1 | 9/2010 | Karalis et al. | |
| 2010/0231053 A1 | 9/2010 | Karalis et al. | |
| 2010/0237706 A1 | 9/2010 | Karalis et al. | |
| 2010/0237707 A1 | 9/2010 | Karalis et al. | |
| 2010/0237708 A1 | 9/2010 | Karalis et al. | |
| 2010/0253152 A1 | 10/2010 | Karalis et al. | |
| 2010/0264745 A1 | 10/2010 | Karalis et al. | |
| 2011/0082612 A1 | 4/2011 | Ichikawa | |
| 2012/0133215 A1 | 5/2012 | Lai et al. | |
| 2012/0323423 A1 | 12/2012 | Nakamura et al. | |
| 2013/0038715 A1 | 2/2013 | Ichikawa | |
| 2013/0127409 A1 | 5/2013 | Ichikawa | |
| 2013/0193749 A1 | 8/2013 | Nakamura et al. | |
| 2013/0320759 A1 | 12/2013 | Abe et al. | |
| 2013/0335015 A1 | 12/2013 | Ichikawa et al. | |
| 2014/0077613 A1 | 3/2014 | Song et al. | |
| 2014/0191584 A1* | 7/2014 | Kato | H02J 7/0044 307/104 |
| 2014/0285030 A1* | 9/2014 | Nakamura | H02J 5/005 307/104 |
| 2015/0008877 A1 | 1/2015 | Ichikawa et al. | |
| 2015/0224883 A1* | 8/2015 | Ichikawa | B60L 11/1842 320/108 |
| 2015/0239354 A1 | 8/2015 | Gorai et al. | |
| 2016/0001668 A1* | 1/2016 | Ichikawa | H02J 5/005 307/9.1 |
| 2016/0001669 A1* | 1/2016 | Ichikawa | H02J 5/005 307/10.1 |

FOREIGN PATENT DOCUMENTS

| | | |
|---|---|---|
| AU | 2007349874 A2 | 10/2008 |
| AU | 2010200044 A1 | 1/2010 |
| CA | 2 615 123 A1 | 1/2007 |
| CA | 2 682 284 A1 | 10/2008 |
| CN | 101258658 A | 9/2008 |
| CN | 101682216 A | 3/2010 |
| CN | 101860089 A | 10/2010 |
| EP | 1 902 505 A2 | 3/2008 |
| EP | 2 130 287 A1 | 12/2009 |
| GB | 2 468 578 A | 9/2010 |
| IN | 735/DELNP/2008 | 8/2008 |
| IN | 6195/DELNP/2009 | 7/2010 |
| JP | 2007-336788 A | 12/2007 |
| JP | 2009-501510 A | 1/2009 |
| JP | 2011-015549 A | 1/2011 |
| JP | 2011-254633 A | 12/2011 |
| JP | 2012-023913 A | 2/2012 |
| JP | 2012-080770 A | 4/2012 |
| JP | 2012-175793 A | 9/2012 |
| JP | 2013-110822 A | 6/2013 |
| JP | 2013-116004 A | 6/2013 |
| JP | 2013-126327 A | 6/2013 |
| JP | 2013-132170 A | 7/2013 |
| JP | 2013-146148 A | 7/2013 |
| JP | 2013-146154 A | 7/2013 |
| JP | 2013-154815 A | 8/2013 |
| JP | 2013-258881 A | 12/2013 |
| KR | 2008-0031398 A | 4/2008 |
| KR | 2010-0015954 A | 2/2010 |
| WO | 2007/008646 A2 | 1/2007 |
| WO | 2008/118178 A1 | 10/2008 |
| WO | 2010/052785 A1 | 5/2010 |
| WO | 2011/132271 A1 | 10/2011 |
| WO | 2014/030294 A1 | 2/2014 |
| WO | 2014/041655 A1 | 3/2014 |

* cited by examiner

POWER RECEPTION DEVICE AND VEHICLE INCLUDING THE SAME

TECHNICAL FIELD

The present invention relates to a power reception device and a vehicle including the same, and particularly to a power reception device which is mounted on a vehicle and receives, in a contactless manner, electric power output from a power transmission device provided outside the vehicle, and the vehicle including the power reception device.

BACKGROUND ART

In recent years, there have been proposed various types of contactless power transfer systems that transfer electric power in a contactless manner between a power reception device provided in a vehicle and a power transmission device provided outside the vehicle (PTLs 1 to 7).

In the aforementioned contactless power transfer system, alignment between the power reception device and the power transmission device is required. For example, Japanese Patent Laying-Open No. 2012-80770 (PTL 1) discloses a vehicle in which parking support is performed by using a power reception unit that receives, in a contactless manner, electric power output from a power transmission device provided outside the vehicle. This vehicle includes: a rectifier for rectifying AC power received by a secondary self-resonant coil (power reception coil) of the power reception unit; a resistance for detecting a distance and a relay that are provided between a pair of power lines on the output side of the rectifier and are serially connected; and a voltage sensor for detecting a voltage generated at the resistance for detecting the distance. When parking support is performed, weak electric power is output from a power transmission coil of a power transmission unit and the aforementioned relay is turned on. Thus, parking support is performed by using the voltage detected by the voltage sensor (refer to PTL 1).

CITATION LIST

Patent Literature

[PTL 1] Japanese Patent Laying-Open No. 2012-80770
[PTL 2] Pamphlet of WO2010/052785
[PTL 3] Japanese Patent Laying-Open No. 2013-154815
[PTL 4] Japanese Patent Laying-Open No. 2013-146154
[PTL 5] Japanese Patent Laying-Open No. 2013-146148
[PTL 6] Japanese Patent Laying-Open No. 2013-110822
[PTL 7] Japanese Patent Laying-Open No. 2013-126327

SUMMARY OF INVENTION

Technical Problem

In the vehicle described in PTL 1, the resistance for detecting the distance, the relay, and the voltage sensor for detecting the voltage generated at the resistance for detecting the distance in response to reception of the weak electric power output from the power transmission device are provided in order to detect a distance between the power transmission coil and the power reception coil (hereinafter referred to as "distance between the coils"). Therefore, the number of components in the vehicle increases, which increases the cost.

Accordingly, an object of the present invention is to, in a power reception device that receives, in a contactless manner, electric power output from a power transmission device provided outside a vehicle, and the vehicle including the power reception device, allow detection of the distance between the coils without providing the afore-mentioned components.

Solution to Problem

According to the present invention, a power reception device is a power reception device which is mounted on a vehicle and receives, in a contactless manner, electric power output from a power transmission device provided outside the vehicle, and the power reception device includes: a power reception coil; a rectifying circuit; a voltage sensor; and a control device. The power reception coil is configured to receive, in a contactless manner, the electric power output from a power transmission coil of the power transmission device. The rectifying circuit includes: a rectifier; and a capacitor provided on an output side of the rectifier, and rectifies the electric power received by the power reception coil. The voltage sensor is provided on an output side of the rectifying circuit. The control device is configured to detect rising of a voltage detected by the voltage sensor, and detects a distance between the coils based on a movement distance of the vehicle from a reference distance indicative of the distance between the coils at which the rising of the voltage occurs, the reference distance is prepared in advance.

In this power reception device, the resistance for detecting the distance is not provided, and thus, electric charge stored in the capacitor of the rectifying circuit during power reception is not discharged immediately. Therefore, although the voltage detected by the voltage sensor changes to increase in accordance with a change in distance between the coils, the voltage detected by the voltage sensor does not change to decrease in accordance with a change in distance between the coils. Therefore, it is difficult to detect the distance between the coils by using a detection value itself of the voltage detected by the voltage sensor. Thus, in this power reception device, the rising of the voltage detected by the voltage sensor is detected, and the distance between the coils is detected based on the movement distance of the vehicle, by using, as a reference, the distance between the coils at which the rising of the voltage occurs. Therefore, according to this power reception device, the distance between the coils can be detected without providing the resistance for detecting the distance, the relay, and the voltage sensor used exclusively for detection of the voltage generated at the resistance for detecting the distance.

Preferably, the power reception device further includes a notifying device. The notifying device is configured to notify detection of the rising of the voltage detected by the voltage sensor. When the rising of the voltage is detected, the notifying device notifies the distance between the coils at which the rising of the voltage occurs.

According to this power reception device, the user can be notified of the accurate distance between the coils based on the detection of the rising of the voltage detected by the voltage sensor.

Preferably, the power reception coil is configured such that, when the vehicle moves such that the power reception coil comes closer to the power transmission coil, a voltage characteristic indicating a relation between the distance between the coils and the aforementioned voltage has first rising and second rising at which the distance between the coils is smaller than a position where the first rising occurs. When the first rising is detected, the notifying device notifies the detection of the first rising, and when the second rising is detected, the notifying device notifies the detection of the second rising.

More preferably, when an increasing rate of the aforementioned voltage becomes equal to or higher than a pre-determined first increasing rate after the start of detection of the distance between the coils, the control device determines that the first rising has been detected and determines that the distance between the coils is a first prescribed distance. When the increasing rate of the aforementioned voltage becomes equal to or higher than a predetermined second increasing rate (higher than the first increasing rate) after it is determined that the distance between the coils is the first prescribed distance, the control device further determines that the second rising has been detected and determines that the distance between the coils is a second prescribed distance. During a period from when the first rising is detected to when the second rising is detected, the control device calculates the distance between the coils based on the first prescribed distance and the movement distance of the vehicle, and when the second rising is detected, the control device calculates the distance between the coils based on the second prescribed distance and the movement distance of the vehicle.

More preferably, when the first rising is detected, the notifying device notifies the first prescribed distance, and when the second rising is detected, the notifying device notifies the second prescribed distance.

In the aforementioned power reception device, the first rising for detecting the first prescribed distance larger than the second prescribed distance is not so steep as the second rising for detecting the second prescribed distance, and a value of the first increasing rate is set at a small value (first increasing rate<second increasing rate). Therefore, the accuracy of detecting the first rising is lower than the accuracy of detecting the second rising. However, by detecting the first rising, the distance between the coils can be notified based on the first prescribed distance at a distant location. On the other hand, the second rising is steep and the accuracy of detecting the second rising is high. After the second rising is detected, the distance between the coils is notified based on the second prescribed distance. Therefore, according to this power reception device, the distance between the coils can be notified based on the first prescribed distance at a distant location, and after the second rising is detected, the distance between the coils can be notified with a high degree of accuracy based on the second prescribed distance.

Preferably, when the aforementioned voltage becomes equal to or higher than a pre-determined voltage after the start of detection of the distance between the coils, the control device determines that the distance between the coils is a first prescribed distance. When an increasing rate of the aforementioned voltage becomes equal to or higher than a predetermined increasing rate after it is determined that the distance between the coils is the first prescribed distance, the control device further determines that the rising of the voltage has been detected and determines that the distance between the coils is a second prescribed distance. During a period from when the first prescribed distance is detected to when the rising of the voltage is detected, the control device calculates the distance based on the first prescribed distance and the movement distance, and when the rising of the voltage is detected, the control device calculates the distance based on the second prescribed distance and the movement distance.

In this power reception device, the voltage when the first prescribed distance larger than the second prescribed distance is detected is low, and thus, the accuracy of detecting the first prescribed distance is low. However, the distance between the coils can be notified based on the first prescribed distance at a distant location. In addition, the rising of the voltage detected after the detection of the first prescribed distance is steep and the accuracy of detecting the rising is high. After the rising of the voltage is detected, the distance between the coils is notified based on the second prescribed distance. Therefore, according to this power reception device, the distance between the coils can be notified based on the first prescribed distance at a distant location, and after the rising of the voltage is detected, the distance between the coils can be notified with a high degree of accuracy based on the second prescribed distance.

Preferably, the vehicle includes a motor that generates vehicle driving force. The control device calculates the movement distance of the vehicle based on the number of rotations of the motor.

According to this power reception device, after the distance between the coils corresponding to the rising of the voltage is detected, the distance between the coils can be accurately detected based on the movement distance of the vehicle calculated based on the number of rotations of the motor.

Preferably, the vehicle includes a power storage device for storing the electric power received by the power reception device. When main power transmission from the power transmission device is performed to charge the power storage device, the control device calculates the received electric power from the power transmission device based on the voltage detected by the voltage sensor, and when the received electric power is equal to or lower than a prescribed value, the control device transmits a command for stopping the main power transmission to the power transmission device.

According to this power reception device, the voltage sensor for measuring the received electric power during main power transmission can be used to detect the distance between the coils, and thus, the number of components can be further reduced.

Preferably, the power transmission device includes a matching circuit for adjusting an impedance of the power transmission device. The impedance is adjusted in the matching circuit based on a power reception efficiency calculated by using the voltage detected by the voltage sensor.

According to this power reception device, the voltage sensor for adjusting the impedance in the matching circuit based on the power reception efficiency can be used to detect the distance between the coils, and thus, the number of components can be further reduced.

Preferably, the power reception coil includes: a winding; and a core around which the winding is wound. The power reception coil is mounted on the vehicle such that a winding axis of the winding extends along a frontward-rearward direction of the vehicle.

In the aforementioned configuration of the power reception coil, in accordance with the relative positional relation between the power transmission coil and the power reception coil, there is a point where the magnetic field of the power reception coil is reversed as the distance between the coils becomes shorter, and due to this, the aforementioned rising of the voltage may occur. This point is unambiguously defined by the size of the coils and the relative positional relation between the coils. Therefore, according to this power reception device, the distance between the coils can be detected with a high degree of accuracy.

According to the present invention, a vehicle includes any one of the aforementioned power reception devices.

Advantageous Effects of Invention

According to the present invention, in a power reception device that receives, in a contactless manner, electric power output from a power transmission device provided outside a vehicle, and the vehicle including the power reception device, the distance between the coils can be detected without providing a dedicated component such as a resistance for detecting a distance.

DESCRIPTION OF EMBODIMENTS

Figure 1:
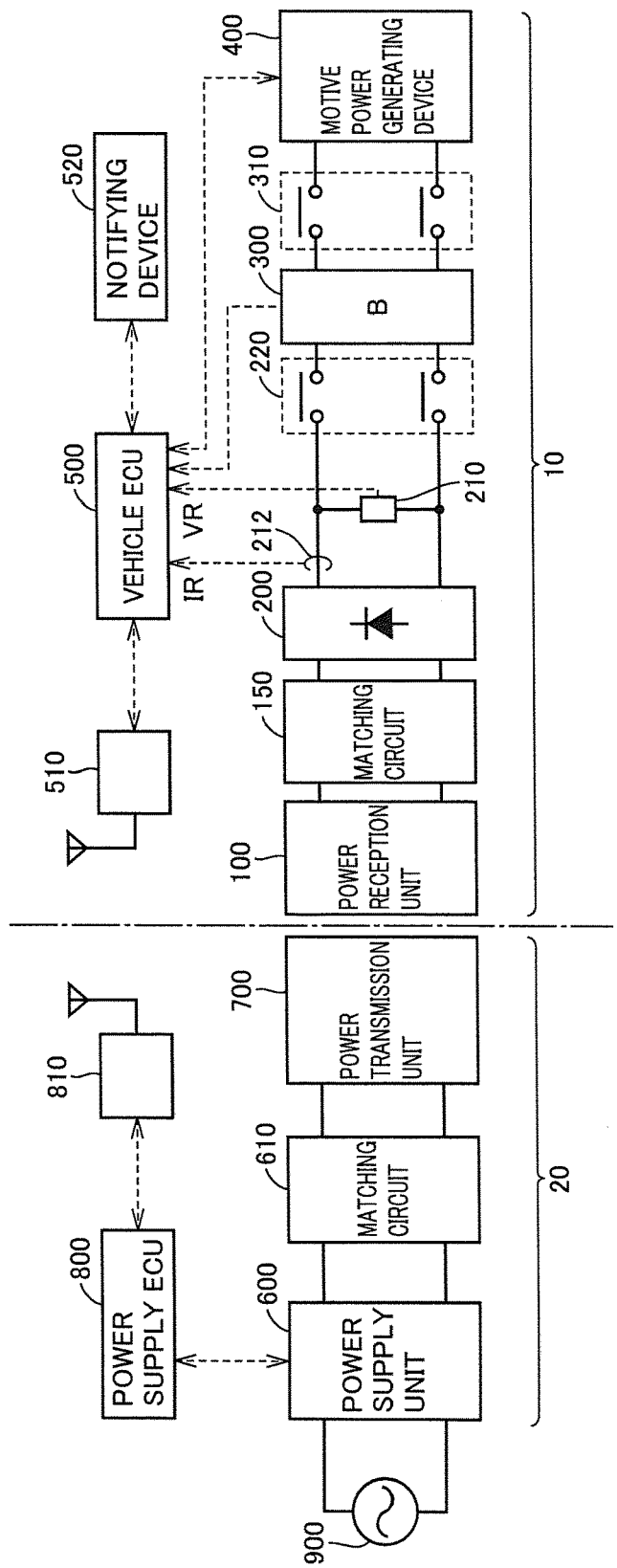
FIG. 1 is an overall configuration diagram of a power transfer system to which a power reception device according to an embodiment of the present invention is applied.

Embodiments of the present invention will be described in detail hereinafter with reference to the drawings. The same or corresponding portions in the drawings are denoted by the same reference characters and description thereof will not be repeated.

First Embodiment

FIG. 1 is an overall configuration diagram of a power transfer system to which a power reception device according to an embodiment of the present invention is applied. Referring to FIG. 1, this power transfer system includes a vehicle 10 and a power transmission device 20. Vehicle 10 includes a power reception unit 100, a matching circuit 150, a rectifying circuit 200, relays 220 and 310, a power storage device 300, and a motive power generating device 400. Vehicle 10 also includes a voltage sensor 210, a current sensor 212, a vehicle ECU (Electronic Control Unit) 500, a communication device 510, and a notifying device 520.

Figure 2:
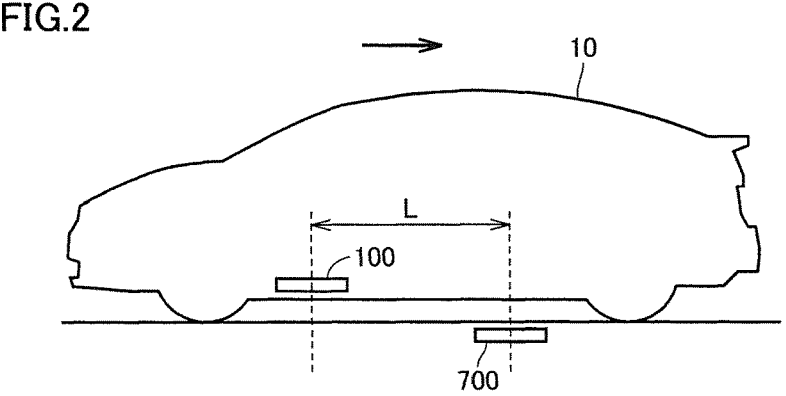
FIG. 2 is a diagram showing arrangement of a power reception unit when a vehicle is viewed from the side.
Figure 3:
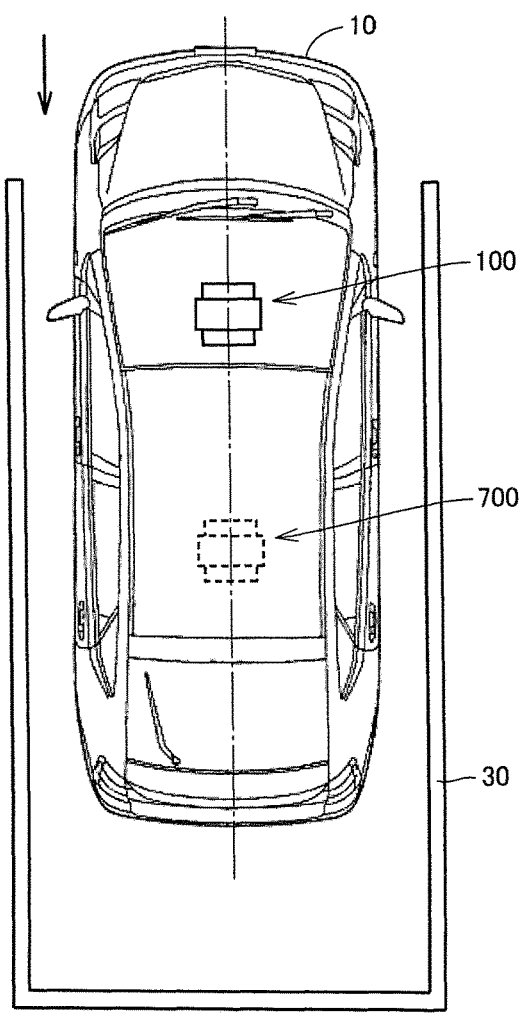
FIG. 3 is a diagram showing arrangement of the power reception unit when the vehicle is viewed from above.

Power reception unit 100 includes a coil for receiving, in a contactless manner, electric power (alternating-current (AC)) output from a power transmission unit 700 (described below) of power transmission device 20. Power reception unit 100 outputs the received electric power to rectifying circuit 200. In the present embodiment, as shown in FIGS. 2 and 3, power transmission unit 700 of power transmission device 20 is provided on or in the ground, and power reception unit 100 is provided at the lower part of the vehicle body close to the front part of the vehicle body.

Matching circuit 150 is provided between power reception unit 100 and rectifying circuit 200 to match an impedance on the vehicle 10 side with an impedance on the power transmission device 20 side. Matching circuit 150 is formed, for example, by an LC circuit including a plurality of inductors and capacitors.

Rectifying circuit 200 rectifies the AC power received by power reception unit 100. Rectifying circuit 200 is configured to include a smoothing capacitor together with a rectifier. A specific configuration of rectifying circuit 200 will be described later.

Voltage sensor 210 is provided on the output side of rectifying circuit 200 to detect a voltage VR indicating an output voltage of rectifying circuit 200 and output the detection value thereof to vehicle ECU 500. Current sensor 212 detects a current IR output from rectifying circuit 200 and outputs the detection value thereof to vehicle ECU 500.

Relay 220 is provided between rectifying circuit 200 and power storage device 300, and is turned on by vehicle ECU 500 when power storage device 300 is charged by power transmission device 20. Prior to charging of power storage device 300 by power transmission device 20, a distance between power transmission unit 700 and power reception unit 100 (distance between the coils) is detected. At the time of detection of the distance between the coils, relay 220 is turned off.

Power storage device 300 is a rechargeable DC power supply and is formed, for example, by a secondary battery such as a lithium ion secondary battery or a nickel-metal hydride secondary battery. The voltage of power storage device 300 is, for example, approximately 200 V.

Motive power generating device 400 generates the travel driving force of vehicle 10 by using the electric power stored in power storage device 300. Although not particularly shown, motive power generating device 400 includes, for example, an inverter that receives the electric power from power storage device 300, a motor driven by the inverter to generate the vehicle driving force, a driving wheel driven by the motor, and the like. Motive power generating device 400 may include a generator for charging power storage device 300, and an engine that can drive the generator.

Vehicle ECU 500 includes a CPU (Central Processing Unit), a storage device, an input/output buffer and the like (all are not shown). Vehicle ECU 500 receives signals from various sensors and outputs control signals to the devices, and also controls the devices in vehicle 10. By way of example, vehicle ECU 500 executes control of travel of vehicle 10, control of charging of power storage device 300 by power transmission device 20, and the like.

Furthermore, as main control executed by vehicle ECU 500, vehicle ECU 500 executes control for detecting the distance between the coils when alignment of power reception unit 100 with power transmission unit 700 is executed and when alignment checking before the start of charging is executed. In this vehicle 10, a resistance for detecting the distance to detect the distance between the coils based on a power reception voltage is not provided. Therefore, vehicle ECU 500 detects the distance between the coils, without using the resistance for detecting the distance.

Specifically, based on the detection value of voltage sensor 210 used to calculate the power reception efficiency in vehicle 10, vehicle ECU 500 detects rising of voltage VR detected by voltage sensor 210. Then, vehicle ECU 500 detects the distance between the coils based on a movement distance of vehicle 10, by using, as a reference, the preliminarily-prepared distance between the coils at which the rising of voltage VR occurs. A method for detecting the distance between the coils will be described in detail later.

When the distance between the coils is detected during execution of alignment and during alignment checking, vehicle ECU 500 controls relay 220 to be turned off. When alignment is completed and power storage device 300 is charged by power transmission device 20, vehicle ECU 500 controls relay 220 to be turned on. As for relay 310, vehicle ECU 500 turns on relay 310 when movement of vehicle 10 is requested (at the time of normal travel and at the time of execution of alignment).

When alignment is executed and when power storage device 300 is charged by power transmission device 20, vehicle ECU 500 communicates with power transmission device 20 using communication device 510 and exchanges, with power transmission device 20, information about the start/stop of charging, the power reception state (such as the power reception efficiency) of vehicle 10, and the like.

Notifying device 520 is controlled by vehicle ECU 500. When rising of voltage VR is detected by vehicle ECU 500, notifying device 520 notifies the detection of the rising of voltage VR. Preferably, when the rising of voltage VR is detected, notifying device 520 notifies, at that timing, the distance between the coils at which the rising of voltage VR occurs, and thereafter, notifies the distance between the coils updated based on the movement distance of vehicle 10. Notifying device 520 is typically a display device that visually displays the information. However, notifying device 520 may use sound or other means to notify the information.

On the other hand, power transmission device 20 includes a power supply unit 600, a matching circuit 610, a power transmission unit 700, a power supply ECU 800, and a communication device 810. Power supply unit 600 receives electric power from an external power supply 900 such as a commercial system power supply, and generates AC power having a prescribed transmission frequency.

Power transmission unit 700 includes a coil for transmitting electric power to power reception unit 100 of vehicle 10 in a contactless manner. Power transmission unit 700 receives the AC power having the transmission frequency from power supply unit 600, and transmits the power to power reception unit 100 of vehicle 10 in a contactless manner via the electromagnetic field generated around power transmission unit 700. A specific configuration of power transmission unit 700 will be described later together with power reception unit 100.

Matching circuit 610 is provided between power supply unit 600 and power transmission unit 700 to match an impedance on the power transmission device 20 side with an impedance on the vehicle 10 side. Specifically, based on the power reception efficiency and the like of vehicle 10 received from vehicle 10 by using communication device 810, matching circuit 610 converts (adjusts) an impedance between power supply unit 600 and power transmission unit 700. A specific configuration of this matching circuit 610 will also be described later.

Power supply ECU 800 includes a CPU, a storage device, an input/output buffer and the like (all are not shown). Power supply ECU 800 receives signals from various sensors and outputs control signals to the devices, and also controls the devices in power transmission device 20. By way of example, power supply ECU 800 executes switching control of power supply unit 600 such that power supply unit 600 generates the AC power having the transmission frequency. The aforementioned control is not limited to processing by software and can also be executed by dedicated hardware (electronic circuit).

When alignment is executed and when the electric power is transmitted to vehicle 10, power supply ECU 800 communicates with communication device 510 of vehicle 10 using communication device 810 and exchanges, with vehicle 10, information about the start/stop of charging, the power reception state (such as the power reception efficiency) of vehicle 10, and the like.

In power transmission device 20, the AC power having the prescribed transmission frequency is supplied from power supply unit 600 through matching circuit 610 to power transmission unit 700. Each of power transmission unit 700 and power reception unit 100 of vehicle 10 includes the coil and the capacitor, and is designed to resonate in the transmission frequency. A Q factor indicating the resonance intensity of power transmission unit 700 and power reception unit 100 is preferably 100 or larger.

When the AC power is supplied from power supply unit 600 through matching circuit 610 to power transmission unit 700, the energy (electric power) moves from power transmission unit 700 to power reception unit 100 via the electromagnetic field formed between the coil of power transmission unit 700 and the coil of power reception unit 100. Then, the energy (electric power) moved to power reception unit 100 is supplied to power storage device 300 through matching circuit 150 and rectifying circuit 200.

FIG. 2 is a diagram showing arrangement of power reception unit 100 when vehicle 10 is viewed from the side. FIG. 3 is a diagram showing arrangement of power reception unit 100 when vehicle 10 is viewed from above. Referring to FIGS. 2 and 3, power transmission unit 700 of power transmission device 20 is disposed within a parking frame 30 and vehicle 10 is parked along parking frame 30. In the present embodiment, vehicle 10 is parked rearward. However, vehicle 10 may be parked frontward.

As described above, each of power reception unit 100 and power transmission unit 700 is configured to include the coil. Each coil includes a winding and a core around which the winding is wound. Power reception unit 100 is mounted on vehicle 10 such that a winding axis of the winding extends along the frontward-rearward direction of vehicle 10. Power transmission unit 700 is disposed such that a winding axis of the winding extends along the vehicle movement direction within parking frame 30. As shown in FIG. 2, a distance L between the central part of power transmission unit 700 and the central part of power reception unit 100 along the movement direction of vehicle 10 corresponds to "distance between the coils".

With parking of vehicle 10 in parking frame 30, alignment of power reception unit 100 with power transmission unit 700 is executed. When alignment is executed, the certain electric power for position checking is output from power transmission unit 700, and distance L between the coils is detected by vehicle ECU 500. As described above, the electric power for position checking is set to be, for example, 1/1000 or less of the electric power output during charging of power storage device 300.

Figure 4:
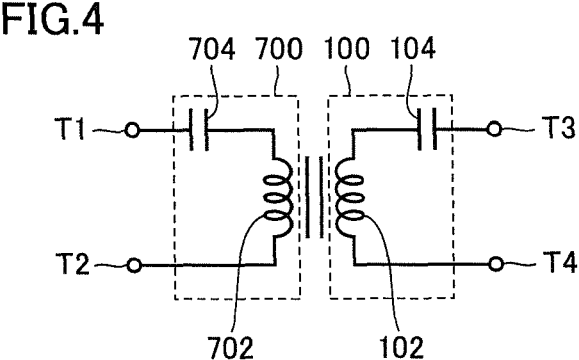
FIG. 4 is a diagram showing one example of a circuit configuration of the power reception unit and a power transmission unit shown in FIG. 1.

FIG. 4 is a diagram showing one example of a circuit configuration of power reception unit 100 and power transmission unit 700 shown in FIG. 1. Referring to FIG. 4, power reception unit 100 includes a coil 102 and a capacitor 104. Capacitor 104 is serially connected to coil 102 to form a resonance circuit together with coil 102. Capacitor 104 is provided to adjust a resonance frequency of power reception unit 100.

Power transmission unit 700 includes a coil 702 and a capacitor 704. Capacitor 704 is serially connected to coil 702 to form a resonance circuit together with coil 702. Capacitor 704 is provided to adjust a resonance frequency of power transmission unit 700.

Figure 5:
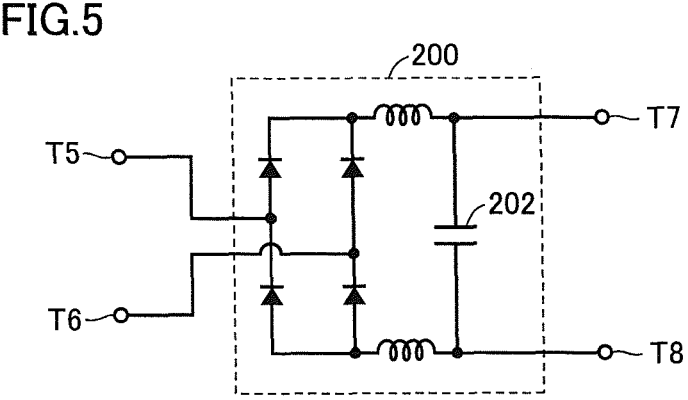
FIG. 5 is a diagram showing one example of a configuration of a rectifying circuit shown in FIG. 1.

FIG. 5 is a diagram showing one example of a configuration of rectifying circuit 200 shown in FIG. 1. Referring to FIG. 5, rectifying circuit 200 includes a rectifier, a capacitor 202 provided on the output side of the rectifier, and a choke coil inserted between the rectifier and capacitor 202. The rectifier is formed, for example, by a diode bridge circuit including four diodes. The choke coil may be omitted. The AC power having passed through matching circuit 150 (FIG. 1) is rectified to DC power by the rectifier, and the DC power is smoothed by capacitor 202 and output to power storage device 300 (FIG. 1).

Figure 6:
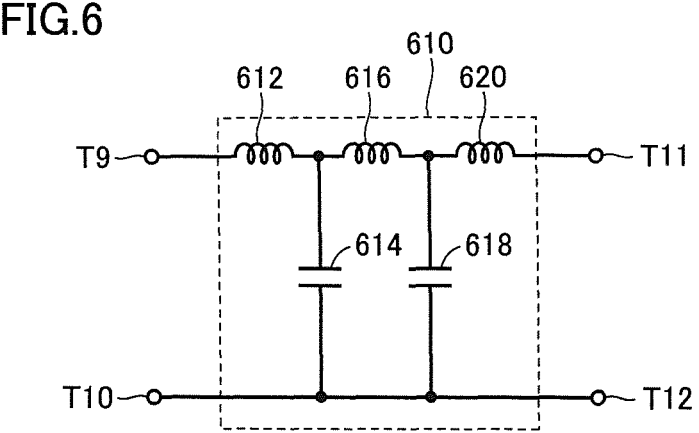
FIG. 6 is a diagram showing one example of a configuration of a matching circuit shown in FIG. 1.

FIG. 6 is a diagram showing one example of a configuration of matching circuit 610 shown in FIG. 1. Matching circuit 150 of vehicle 10 also has the similar configuration. Referring to FIG. 6, matching circuit 610 includes coils 612, 616 and 620, and capacitors 614 and 618. Coils 612, 616 and 620 are provided in one of a pair of power lines between power supply unit 600 (FIG. 1) and power transmission unit 700, and in the present embodiment, coils 612, 616 and 620 are serially connected between terminals T9 and T11. Between coils 612 and 616, capacitor 614 is connected to between the pair of power lines. Between coils 616 and 620, capacitor 618 is connected to between the pair of power lines.

Figure 7:
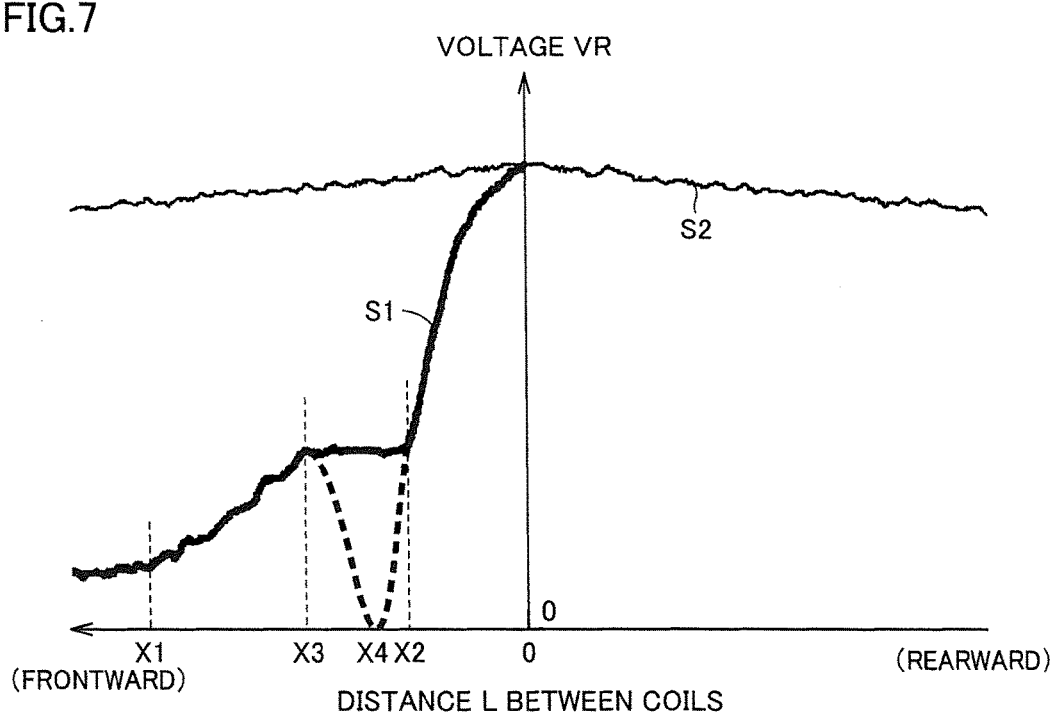
FIG. 7 is a diagram showing relation between a distance between coils and a voltage detected by a voltage sensor, when alignment is executed.

FIG. 7 is a diagram showing relation between distance L between the coils and voltage VR detected by voltage sensor 210, when alignment is executed. Referring to FIG. 7, assuming that a position where power reception unit 100 directly faces power transmission unit 700 is defined as the distance between the coils being 0, "frontward" in the horizontal axis indicative of distance L between the coils means that vehicle 10 is located more frontward than the directly facing position along the vehicle movement direction, and distance L between the coils has a positive value.

A curved line S1 indicates a voltage characteristic when vehicle 10 is parked rearward from outside parking frame 30 (FIG. 3) to within parking frame 30 and alignment between the coils is executed. When distance L between the coils reaches X1, voltage VR starts to increase (first rising). Thereafter, as distance L between the coils becomes smaller, voltage VR increases. When distance L between the coils becomes smaller than X3 (X3<X1), the increase in voltage VR stops temporarily. When vehicle 10 moves rearward further and distance L between the coils reaches X2 (X2<X3), voltage VR starts to increase again (second rising). When distance L between the coils is 0 (directly facing position), voltage VR is maximized.

"First rising" and "second rising" of voltage VR are detected as follows. As for the first rising, the first rising is detected when an increasing rate (changing rate) of voltage VR becomes equal to or higher than a predetermined first increasing rate. As for the second rising, the second rising is detected when the increasing rate of voltage VR becomes equal to or higher than a predetermined second increasing rate (second increasing rate>first increasing rate). In order to remove an influence of noise, an average value of the increasing rate (such as a moving average) is preferably used as the increasing rate of voltage VR.

The first rising is not so steep as the second rising and a value of the first increasing rate is set at a small value (first increasing rate<second increasing rate). Therefore, the accuracy of detecting the first rising is lower than the accuracy of detecting the second rising. However, by detecting the first rising, distance L between the coils can be detected at a distant location. On the other hand, the second rising is steep and the accuracy of detecting the second rising is high. After the second rising is detected, distance L between the coils is detected by using, as a reference, the point where distance L between the coils is X2. As described above, according to the present embodiment, distance L between the coils can be detected at a distant location, and after the second rising is detected, distance L between the coils can be detected with a high degree of accuracy, by using, as a reference, the point where distance L between the coils is X2.

Description will be given below to a reason why the characteristic of voltage VR as shown in FIG. 7 is exhibited with respect to the change in distance L between the coils, in a region where distance L between the coils is smaller than X3.

Figure 8:
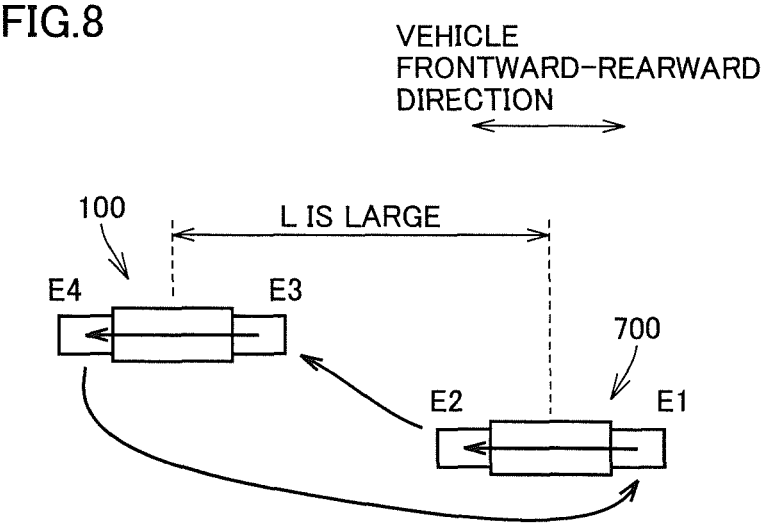
FIG. 8 is a diagram showing a magnetic field formed in the power transmission unit and the power reception unit when the distance between the coils is larger than X4.
Figure 9:
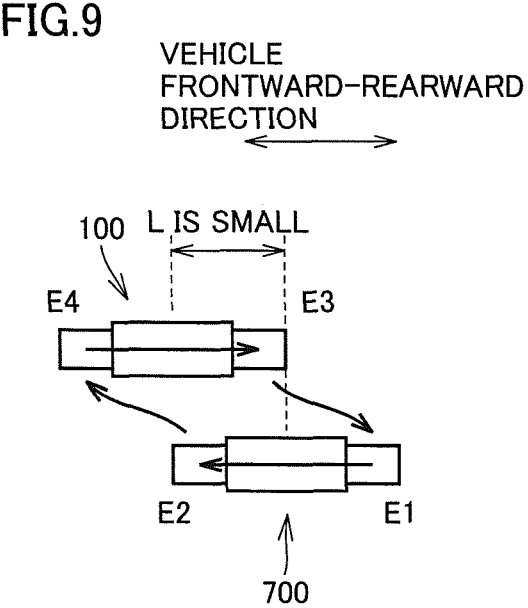
FIG. 9 is a diagram showing a magnetic field formed in the power transmission unit and the power reception unit when the distance between the coils is smaller than X4.

FIG. 8 is a diagram showing a magnetic field formed in power transmission unit 700 and power reception unit 100 when distance L between the coils is larger than X4 (X2<X4<X3, see FIG. 7). FIG. 9 is a diagram showing a magnetic field formed in power transmission unit 700 and power reception unit 100 when distance L between the coils is smaller than X4. The AC magnetic field is generated in power transmission unit 700 and power reception unit 100 in accordance with the AC power generated by power supply unit 600 (FIG. 1). FIGS. 8 and 9 show the state when the magnetic field is formed in the direction from an end E1 toward an end E2 in power transmission unit 700.

Referring to FIG. 8, when distance L between the coils is larger than X4, the magnetic field is formed to travel from end E2 of power transmission unit 700 to an end E3 of power reception unit 100, pass through the core of power reception unit 100 and return from an end E4 of power reception unit 100 to end E1 of power transmission unit 700. The magnetic field in the direction from end E3 toward end E4 is formed in the core of power reception unit 100, and a current corresponding to this direction of the magnetic field is induced in the winding of power reception unit 100.

On the other hand, referring to FIG. 9, when distance L between the coils is smaller than X4, the magnetic field is formed to travel from end E2 of power transmission unit 700 to end E4 of power reception unit 100, pass through the core of power reception unit 100 and return from end E3 of power reception unit 100 to end E1 of power transmission unit 700. The magnetic field in the direction from end E4 toward end E3 is formed in the core of power reception unit 100, and a current corresponding to this direction of the magnetic field is induced in the winding of power reception unit 100.

Referring again to FIG. 7, before and after distance L between the coils reaches X4, the phase of the current induced in power reception unit 100 is reversed. Therefore, when distance L between the coils is X4, the electric power received by power reception unit 100 is 0 in principle (dotted line). In reality, however, due to smoothing capacitor 202 (FIG. 5) provided in rectifying circuit 200 (FIG. 1), voltage VR measured by voltage sensor 210 does not decrease as shown by curved line S1. Then, when distance L between the coils becomes smaller and reaches X2, voltage VR starts to increase again.

As described above, there exists a region where the change (decrease) in voltage VR is suppressed by capacitor 202 even when distance L between the coils changes. Therefore, it is difficult to detect distance L between the coils based on the detection value of voltage VR itself. Thus, in the present embodiment, the risings of voltage VR when distance L between the coils is X1 and X2 ("first rising" when distance L between the coils is X1 and "second rising" when distance L between the coils is X2) are detected, and distance L between the coils (X1, X2) is detected in accordance with the detection of the risings of voltage VR. Then, by using, as a reference, the points where distance L between the coils is X1 and X2, distance L between the coils is detected based on the movement distance of vehicle 10 from the reference points.

The movement distance of vehicle 10 can be calculated based on the number of rotations of the motor or the driving wheel included in motive power generating device 400 (FIG. 1) to generate the vehicle driving force. The number of rotations of the motor or the driving wheel may be calculated by counting the number of rotations itself or by summing the rotation speed of the motor or the driving wheel.

After passage through the point where voltage VR is maximized, i.e., the point where distance L between the coils is 0, the change in voltage VR is suppressed by capacitor 202. Therefore, the characteristic of voltage VR is as shown by a curved line S2.

Figure 10:
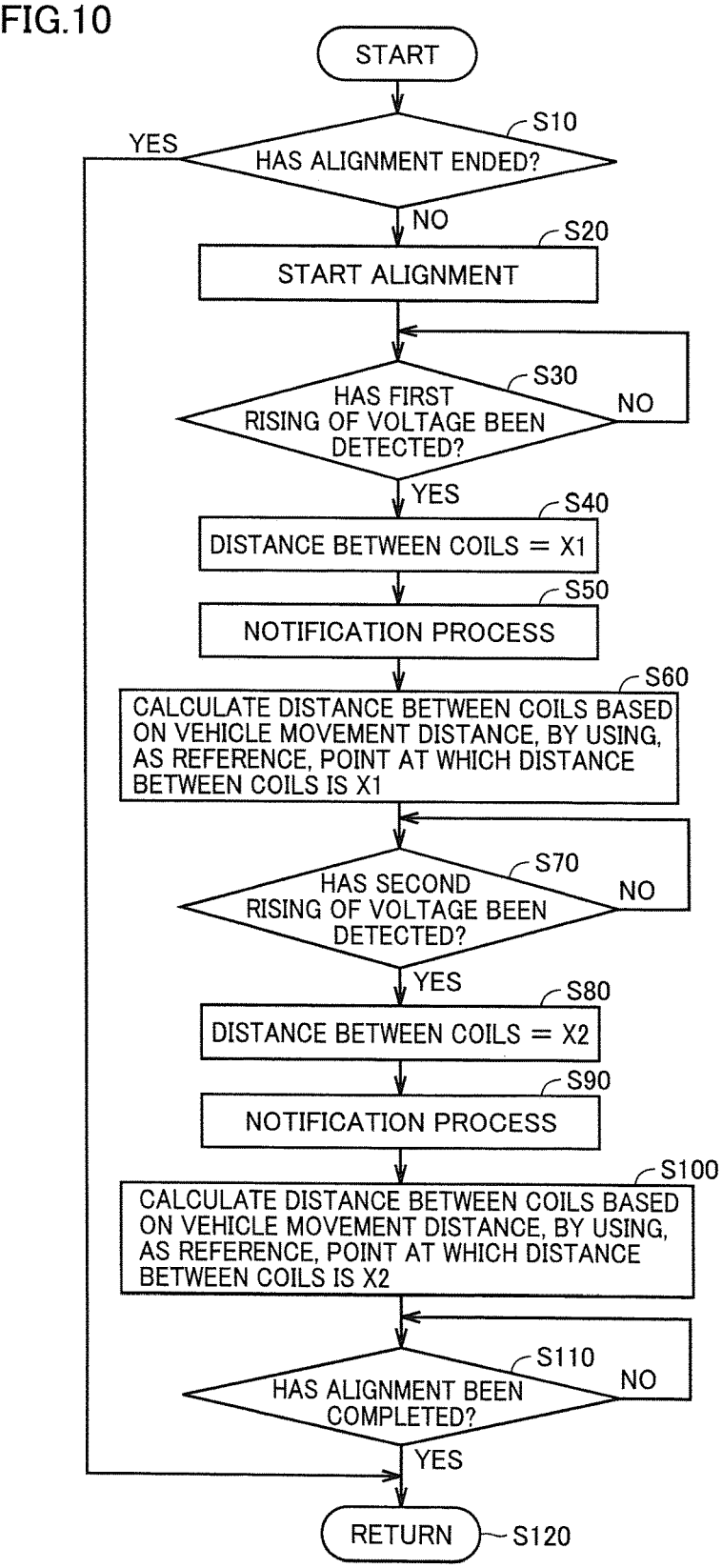
FIG. 10 is a flowchart for describing a procedure for detecting the distance between the coils when alignment is executed.

FIG. 10 is a flowchart for describing a procedure for detecting distance L between the coils when alignment is executed. The process shown in this flowchart is started, for example, when a request for outputting the electric power for position checking is sent from vehicle 10 to power transmission device 20, and ends when alignment ends and a request for stopping the electric power for position checking is sent from vehicle 10 to power transmission device 20.

When alignment ends, relay 220 (FIG. 1) is connected and transmission of large electric power (main power transmission) from power transmission device 20 is started. The electric power output from power transmission device 20 during charging of power storage device 300 is larger than the electric power output during execution of alignment and during alignment checking, and is set to be, for example, approximately 100 times as large as the electric power output during alignment.

During charging of power storage device 300, vehicle ECU 500 calculates the received electric power based on the voltage detected by voltage sensor 210 and the current detected by current sensor 212. During power transmission from power transmission device 20, power supply ECU 800 transmits a value of the transmitted electric power from communication device 810 to communication device 510.

In the case where the received electric power is smaller than a prescribed value even if the received value of the transmitted electric power is larger than a prescribed value, vehicle ECU 500 transmits a power transmission stop command to power transmission device 20. This is because there can be some abnormality in power transfer in this case.

As described above, in the system according to the present embodiment, voltage sensor 210 is used both for measurement of the power reception voltage during alignment and for measurement of the received electric power during main power transmission. Since voltage sensor 210 is used for the aforementioned two functions as described above, the number of components can be reduced.

Referring to FIGS. 1 and 7 together with FIG. 10, vehicle ECU 500 first determines whether alignment between the coils has ended or not (step S10). If alignment has ended (YES in step S10), the subsequent process is not executed and the process proceeds to step S120.

If it is determined in step S10 that alignment has not ended (NO in step S10), vehicle ECU 500 starts control for alignment (step S20). Specifically, vehicle ECU 500 turns off relay 220 (FIG. 1) and turns on relay 310 (FIG. 1), and permits movement of vehicle 10 to parking frame 30. Vehicle 10 may be driven automatically or by the user.

During movement of vehicle 10 caused by alignment, vehicle ECU 500 determines whether the first rising of voltage VR detected by voltage sensor 210 (FIG. 1) has been detected or not (step S30). As described above, this first rising corresponds to the rising of voltage VR when distance L between the coils is X1 (FIG. 7). If the first rising of voltage VR has been detected (YES in step S30), vehicle ECU 500 sets distance L between the coils at X1 (step S40) and executes the prescribed notification process by notifying device 520 (step S50). This notification process in step S50 may be, for example, a process of notifying the detection of the first rising of voltage VR by sound, or a process of displaying distance L between the coils as X1.

Thereafter, by using, as a reference, the point where distance L between the coils is X1, vehicle ECU 500 calculates distance L between the coils based on the movement distance of vehicle 10 calculated based on the number of rotations (or a summed value of the rotation speed) of the motor (the driving wheel may be used) that generates the vehicle driving force (step S60). Calculated distance L between the coils is notified by notifying device 520.

Next, vehicle ECU 500 determines whether the second rising of voltage VR detected by voltage sensor 210 has been detected or not (step S70). This second rising corresponds to the rising of voltage VR when distance L between the coils is X2 (FIG. 7). If the second rising of voltage VR has been detected (YES in step S70), vehicle ECU 500 sets distance L between the coils at X2 (step S80) and executes the prescribed notification process by notifying device 520 (step S90). This notification process in step S90 may be, for example, a process of notifying the detection of the second rising of voltage VR by sound, or a process of updating and displaying distance L between the coils as X2.

Thereafter, by using, as a reference, the point where distance L between the coils is X2, vehicle ECU 500 calculates distance L between the coils based on the movement distance of vehicle 10 calculated based on the number of rotations (or a summed value of the rotation speed) of the motor (or the driving wheel) that generates the vehicle driving force (step S100). In accordance with distance L between the coils calculated in step S100, display of distance L between the coils on notifying device 520 is updated.

Then, if distance L between the coils falls within a prescribed range and it is determined that alignment has been completed (YES in step S110), the process proceeds to step S120 and the series of process ends.

Since voltage VR exhibits the movement as shown by curved line S2 (FIG. 7) after the vehicle passes through the prescribed range, the position cannot be specified based on voltage VR. In the system according to the present embodiment, by using X2 which is a clear reference, the distance between the coils can be accurately calculated based on the number of rotations of the motor, a steering angle of a steering, and the like.

As described above, in this first embodiment, the rising of voltage VR detected by voltage sensor 210 is detected, and distance L between the coils is detected based on the movement distance of vehicle 10, by using, as a reference, the distance between the coils (X1, X2) at which the rising of voltage VR occurs. Therefore, according to this first embodiment, distance L between the coils can be detected without providing the resistance for detecting the distance.

In the case where distance L between the coils is detected based on the first rising of voltage VR, distance L between the coils can be detected at a more distant location. However, as shown in FIG. 7, the rising of voltage VR is not so steep as the second rising of voltage VR when distance L between the coils is X2, and the accuracy of detecting the rising of voltage VR is problematic. On the other hand, in the case where distance L between the coils is detected based on the second rising of voltage VR, the detection range of distance L between the coils is narrower than in the case where distance L between the coils is detected based on the first rising. However, the rising of voltage VR is steep, and thus, the rising of voltage VR can be detected with a high degree of accuracy and the accuracy of detecting distance L between the coils is high.

Second Embodiment

In the first embodiment, the two risings ("first rising" and "second rising") of voltage VR are detected. However, only one rising of voltage VR, i.e., only "second rising" in the first embodiment, may be detected.

In this second embodiment, when vehicle 10 is parked rearward from outside parking frame 30 (FIG. 3) to within parking frame 30 and alignment between the coils is executed, it is determined that distance L between the coils is X1 when voltage VR starts to increase and becomes equal to or higher than a predetermined voltage. Thereafter, as distance L between the coils becomes smaller, voltage VR increases. When the rising (corresponding to "second rising" in the first embodiment) of voltage VR is detected, it is determined that distance L between the coils is X2. This second embodiment is different from the first embodiment in that, instead of detecting "first rising" in the first embodiment, it is determined that distance L between the coils is X1 based on the magnitude of voltage VR, and only one rising of voltage VR is detected. The remaining points of the second embodiment are the same as those of the first embodiment.

In this second embodiment, voltage VR when distance L between the coils is X1 is low, and thus, the accuracy of detecting distance X1 is low. However, distance L between the coils can be notified based on distance X1 at a distant location. In addition, the rising of voltage VR when distance L between the coils is X2 is steep and the accuracy of detecting the rising is high. After the rising of voltage VR is detected, distance L between the coils is notified based on distance X2. As described above, according to the second embodiment, distance L between the coils can be notified based on distance X1 at a distant location, and after the rising of voltage VR is detected, distance L between the coils can be notified with a high degree of accuracy based on distance X2.

Figure 11:
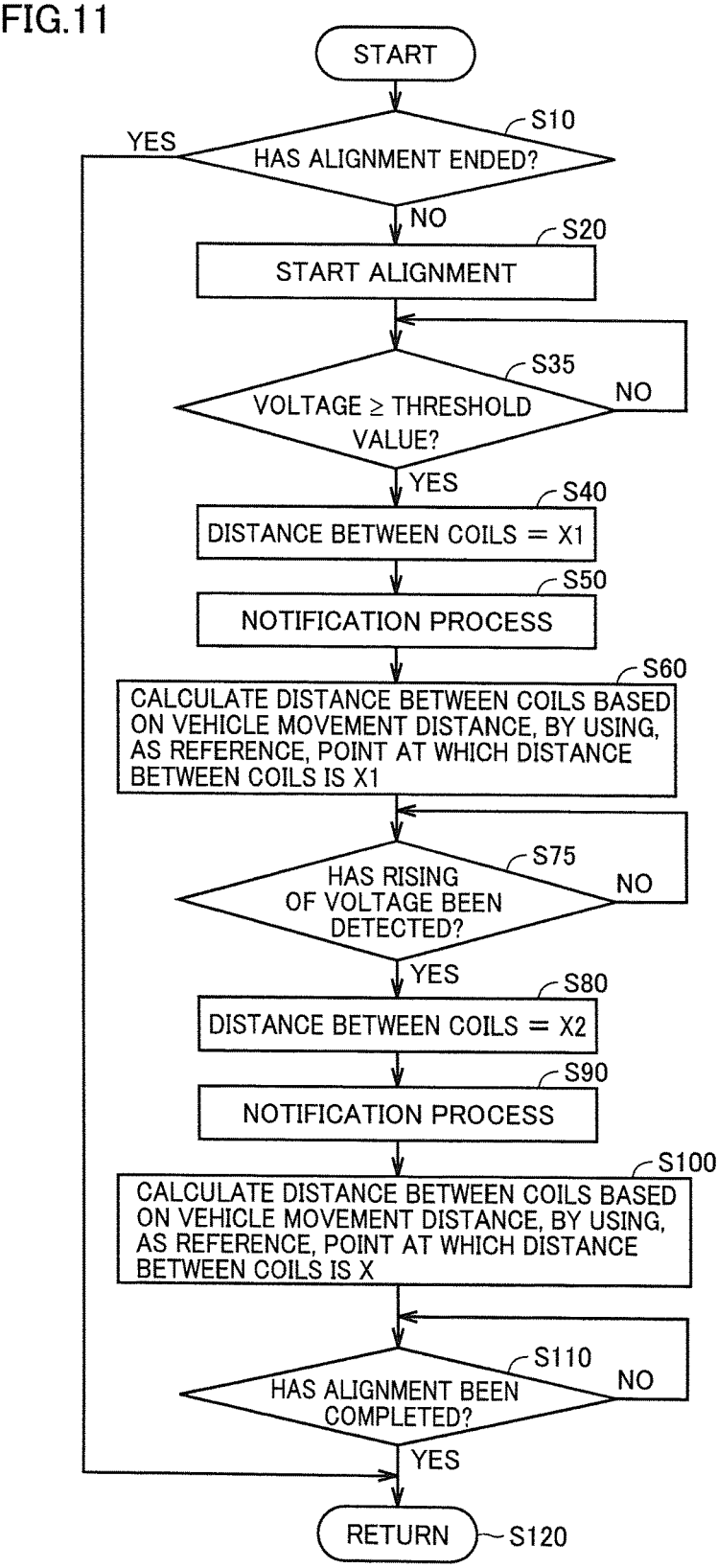
FIG. 11 is a flowchart for describing a procedure for detecting the distance between the coils when alignment is executed in a second embodiment.

FIG. 11 is a flowchart for describing a procedure for detecting distance L between the coils when alignment is executed in the second embodiment. Referring to FIG. 11, this flowchart is different from the flowchart in the first embodiment shown in FIG. 10 in that steps S35 and S75 are included instead of steps S30 and S70.

Namely, when the control for alignment is started in step S20, vehicle ECU 500 determines, during movement of vehicle 10 caused by alignment, whether or not voltage VR detected by voltage sensor 210 (FIG. 1) has become equal to or higher than a predetermined threshold value (step S35). If it is determined that voltage VR has become equal to or higher than the threshold value (YES in step S35), the process proceeds to step S40 and distance L between the coils is set at X1.

When distance L between the coils is calculated in step S60, vehicle ECU 500 determines whether the rising of voltage VR has been detected or not (step S75). This rising corresponds to the rising of voltage VR when distance L between the coils is X2 (FIG. 7). If the rising of voltage VR has been detected (YES in step S75), the process proceeds to step S80 and distance L between the coils is set at X2.

As described above, according to this second embodiment as well, distance L between the coils can be detected with a high degree of accuracy, without providing the resistance for detecting the distance, similarly to the first embodiment.

In each of the aforementioned embodiments, capacitors 614 and 618 of matching circuit 610 in power transmission device 20 may be variable capacitors. The capacitance of capacitors 614 and 618 may be adjusted based on the power reception efficiency and the like in vehicle 10, and the impedance of power transmission device 20 may be adjusted. The power reception efficiency herein is calculated by using the voltage detected by voltage sensor 210 (FIG. 1) of vehicle 10. Specifically, the power reception efficiency is a ratio between the received electric power calculated based on voltage VR detected by voltage sensor 210 and current IR detected by current sensor 212 (FIG. 1), and the transmitted electric power output from power transmission device 20. Namely, voltage sensor 210 of vehicle 10 is used for adjustment of the impedance by matching circuit 610.

In this case as well, voltage sensor 210 is used both for measurement of the power reception voltage during alignment and for measurement of the power reception efficiency during impedance adjustment by matching circuit 610. Since voltage sensor 210 is used for the two functions, the number of components can be reduced.

It should be understood that the embodiments disclosed herein are illustrative and not limitative in any respect. The scope of the present invention is defined by the terms of the claims, rather than the description of the embodiments above, and is intended to include any modifications within the scope and meaning equivalent to the terms of the claims.

REFERENCE SIGNS LIST 10 vehicle; 20 power transmission device; 30 parking frame; 100 power reception unit; 102, 612, 616, 620, 702 coil; 104, 202, 704 capacitor; 150, 610 matching circuit; 200 rectifying circuit; 210 voltage sensor; 212 current sensor; 220, 310 relay; 300 power storage device; 400 motive power generating device; 500 vehicle ECU; 510, 810 communication device; 520 notifying device; 600 power supply unit; 614, 618 capacitor; 700 power transmission unit; 800 power supply ECU; 900 external power supply.

The invention claimed is:

1. A power reception device which is mounted on a vehicle and receives, in a contactless manner, electric power output from a power transmission device provided outside said vehicle, the power reception device comprising:
   a power reception coil configured to receive, in a contactless manner, the electric power output from a power transmission coil of said power transmission device;
   a rectifying circuit for rectifying the electric power received by said power reception coil; and
   a notifying device configured to notify detection of the rising of said voltage;
   said power reception coil is configured such that, when said vehicle moves such that said power reception coil comes closer to said power transmission coil, a voltage characteristic indicating a relation between said distance and said voltage has first rising and second rising at which said distance is smaller than a position where said first rising occurs, said rectifying circuit including:
a rectifier; and
a capacitor provided on an output side of said rectifier,
a voltage sensor provided on an output side of said rectifying circuit; and
a control device configured to detect a distance between said power transmission coil and said power reception coil,
said control device detecting rising of a voltage detected by said voltage sensor, and detecting said distance based on a movement distance of said vehicle from a reference distance indicative of said distance at which the rising of said voltage occurs, said reference distance being prepared in advance, and
when the rising of said voltage is detected, said notifying device notifies said reference distance,
when said first rising is detected, said notifying device notifies the detection of said first rising, and when said second rising is detected, said notifying device notifies the detection of said second rising.

2. The power reception device according to claim 1, wherein
when an increasing rate of said voltage becomes equal to or higher than a predetermined first increasing rate after the start of detection of said distance, said control device determines that said first rising has been detected and determines that said distance is a first prescribed distance,
when the increasing rate of said voltage becomes equal to or higher than a predetermined second increasing rate higher than said first increasing rate after it is determined that said distance is said first prescribed distance, said control device further determines that said second rising has been detected and determines that said distance is a second prescribed distance, and
during a period from when said first rising is detected to when said second rising is detected, said control device calculates said distance based on said first prescribed distance and said movement distance, and when said second rising is detected, said control device calculates said distance based on said second prescribed distance and said movement distance.

3. The power reception device according to claim 1, wherein
when said first rising is detected, said notifying device notifies said first prescribed distance, and when said second rising is detected, said notifying device notifies said second prescribed distance.

4. The power reception device according to claim 1, wherein
said vehicle includes a motor that generates vehicle driving force, and
said control device calculates the movement distance of said vehicle based on the number of rotations of said motor.

5. The power reception device according to claim 1, wherein
said vehicle includes a power storage device for storing the electric power received by said power reception device, and
when main power transmission from said power transmission device is performed to charge said power storage device, said control device calculates the received electric power from said power transmission device based on the voltage detected by said voltage sensor, and when said received electric power is equal to or lower than a prescribed value, said control device transmits a command for stopping said main power transmission to said power transmission device.

6. The power reception device according to claim 1, wherein
said power transmission device includes a matching circuit for adjusting an impedance of said power transmission device, and
said impedance is adjusted in said matching circuit based on a power reception efficiency calculated by using the voltage detected by said voltage sensor.

7. The power reception device according to claim 1, wherein
said power reception coil includes:
a winding; and
a core around which said winding is wound, and
said power reception coil is mounted on said vehicle such that a winding axis of said winding extends along a frontward-rearward direction of said vehicle.

8. A vehicle comprising the power reception device as recited in claim 1.

9. A power reception device which is mounted on a vehicle and receives, in a contactless manner, electric power output from a power transmission device provided outside said vehicle, the power reception device comprising:
a power reception coil configured to receive, in a contactless manner, the electric power output from a power transmission coil of said power transmission device;
a rectifying circuit for rectifying the electric power received by said power reception coil;
said rectifying circuit including:
a rectifier; and
a capacitor provided on an output side of said rectifier,
a voltage sensor provided on an output side of said rectifying circuit; and
a control device configured to detect a distance between said power transmission coil and said power reception coil,
said control device detecting rising of a voltage detected by said voltage sensor, and detecting said distance based on a movement distance of said vehicle from a reference distance indicative of said distance at which the rising of said voltage occurs, said reference distance being prepared in advance,
when said voltage becomes equal to or higher than a predetermined voltage after the start of detection of said distance, said control device determines that said distance is a first prescribed distance,
when an increasing rate of said voltage becomes equal to or higher than a predetermined increasing rate after it is determined that said distance is said first prescribed distance, said control device further determines that the rising of said voltage has been detected and determines that said distance is a second prescribed distance, and
during a period from when said first prescribed distance is detected to when the rising of said voltage is detected, said control device calculates said distance based on said first prescribed distance and said movement distance, and when the rising of said voltage is detected, said control device calculates said distance based on said second prescribed distance and said movement distance.

* * * * *